United States Patent [19]

Schultz

[11] Patent Number: 5,131,426

[45] Date of Patent: Jul. 21, 1992

[54] VALVING SYSTEM FOR WATER FLOW TO TURBINE ENGINE EMISSION SYSTEM

[75] Inventor: Matthew S. Schultz, Sarasota, Fla.

[73] Assignee: Dana Corporation, Toledo, Ohio

[21] Appl. No.: 696,443

[22] Filed: May 6, 1991

[51] Int. Cl.⁵ ............................................ F16K 11/04
[52] U.S. Cl. .................................... 137/312; 137/869; 137/871; 251/117; 251/900
[58] Field of Search ............... 137/312, 599, 869, 871, 137/613; 251/63, 117, 900

[56] References Cited

U.S. PATENT DOCUMENTS

| | | |
|---|---|---|
| 2,664,910 | 1/1954 | Boyd et al. |
| 2,700,394 | 1/1955 | Jay |
| 4,436,108 | 3/1984 | Ellsworth ............... 137/312 X |
| 4,546,796 | 10/1985 | Bourquin |
| 4,664,151 | 5/1987 | Piet ............... 137/312 X |
| 4,733,527 | 3/1988 | Kidd |
| 4,749,002 | 6/1988 | Lembser ............... 137/312 X |
| 4,762,277 | 8/1988 | Pater et al. ............... 137/312 X |
| 4,799,513 | 1/1989 | Strong et al. |
| 4,989,831 | 2/1991 | Ootsuki et al. ............... 137/312 X |

OTHER PUBLICATIONS

Drawing of Dana Corporation Prior Art Water Valve Assembly.

Primary Examiner—Stephen M. Hepperle
Attorney, Agent, or Firm—Dykema Gossett

[57] ABSTRACT

An improved valve for controlling flow of water to a turbine engine is disclosed. A hydraulically actuated spool valve controls the volume of water flow. An inventive seal and drain system ensures that no hydraulic oil mixes with the water being directed to the turbine engine, which would increase emissions from the engine. Further, the system ensures that no water will intermix with the hydraulic fluid in the pressure chambers for the spool valve, which could degrade the oil in the hydraulic system.

17 Claims, 2 Drawing Sheets

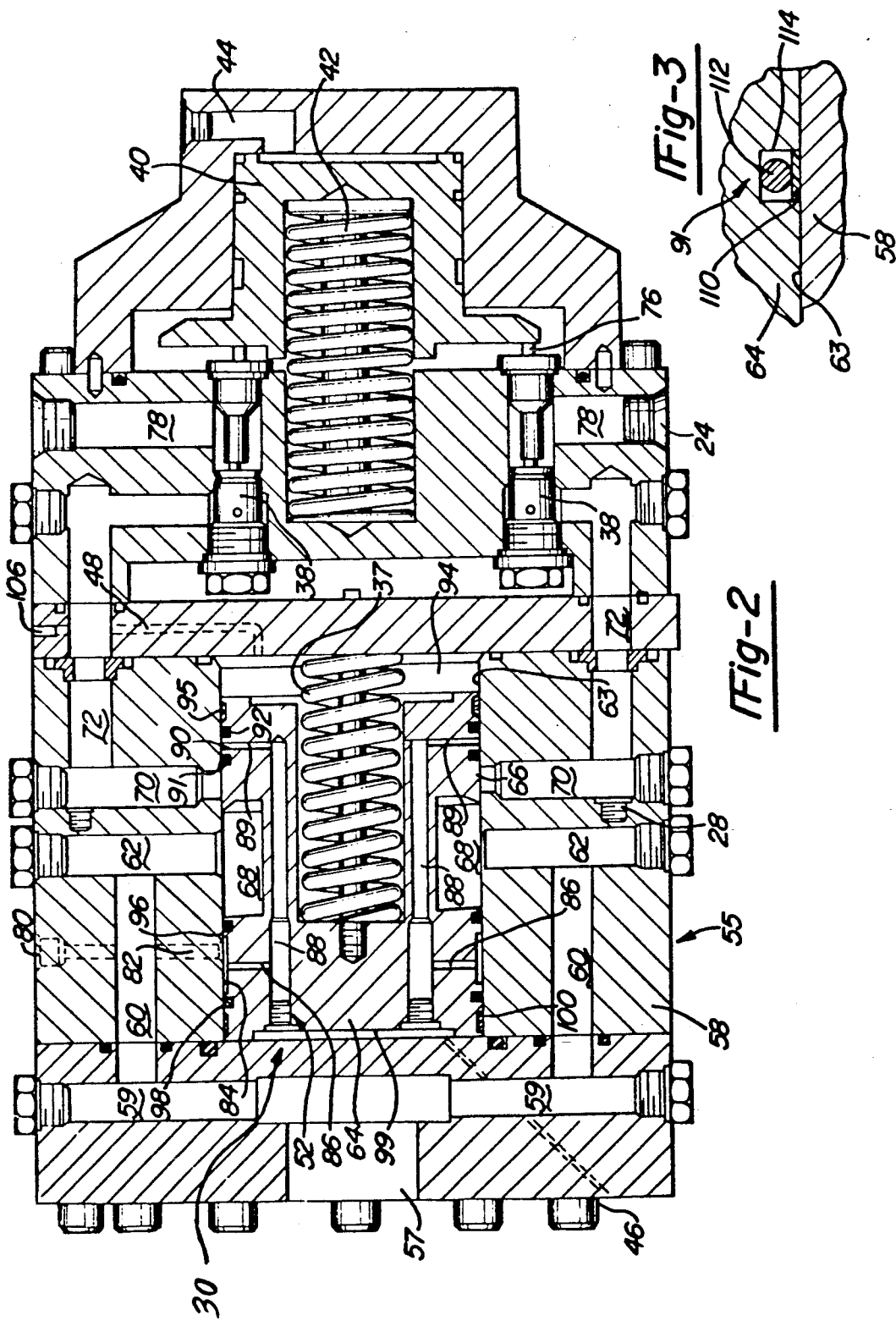

VALVING SYSTEM FOR WATER FLOW TO TURBINE ENGINE EMISSION SYSTEM

BACKGROUND OF THE INVENTION

This application in general relates to an improved valving system for dividing water flow to a turbine engine.

Some turbine engines require water to be injected into the combustion chamber at a plurality of points for emission control. Complicated valving systems have been utilized in the prior art to evenly distribute and supply the water to these plural points. As many as fourteen water supply lines need to be supplied with relatively equal amounts of water. A turbine engine could be described as turbine blade mounted in a combustion chamber such that combustion drives the blade. One such turbine is used as an electric generator.

Prior art valve systems which divide flow between the various water supply lines exist. Those systems typically utilize a plurality of valves, and do not always equally distribute and adequately supply the water to the various supply lines.

One prior art valve operates to divide a water supply into fourteen relatively equal flows. Fourteen separate water flows are initially blocked by a single staging valve which is closed upon start-up of the engine. The water being blocked by the staging valve passes through restrictions leading to an isolation valve. The isolation valve is selectively opened or closed to allow flow to the turbine engine. Upon start-up of the engine the isolation valve is opened and water is delivered to the combustion chamber. After start-up, the staging valve is opened to increase the flow of water through the isolation valves into the engine.

This known staging valve includes a spool valve which has a valving land and groove at a central location. The water being delivered to the turbine engine either moves through the valving groove or is blocked by the valving land. Separate pistons abut the ends of the spool valve, and hydraulic chambers are defined outwardly of the pistons. The hydraulic chambers are selectively supplied with pressurized oil to move the pistons and change the position of the spool valve. If the high pressure oil leaks past the valving land, oil could be mixed with the water delivered to the combustion chamber of the turbine engine. This is undesirable and can increase emissions from the turbine engine. Reduction of emissions is a major goal in engine design. Also, water may leak from the valving groove towards the hydraulic chambers. If this water reaches the hydraulic chambers it could degrade the oil.

Since this known spool valve is positioned by separate hydraulically actuated pistons, there are leakage spaces between the pistons and the spool valve. Further, a complicated drain system is utilized to prevent mixing of the oil and water. In part, the drain system incorporates the spaces between the pistons and the spool valve. It is desirable to develop a simpler, more effective sealing and drain system for the spool valve.

SUMMARY OF THE INVENTION

An improved valving system similar to that described above is disclosed wherein intermixing of the water and a hydraulic oil used to position the spool valve is prevented. More particularly, the present invention relates to a unique sealing and draining assembly that ensures water will not reach the oil in the hydraulic chambers, while at the same time ensuring that the oil will not reach the water being distributed to the turbine engine.

In a disclosed embodiment of the present invention, a spool valve is movable within a valve orifice and has hydraulic chambers defined at its two axial ends to control movement of the valve relative to the valve body. The spool valve ends are thus the hydraulic pistons, and are integral with the remainder of the spool valve, eliminating the prior art leakage spaces. The spool valve includes a valving groove at a central location which selectively aligns several sets of flow passages. When the orifice aligns the flow passages water can pass between them and move downstream towards the turbine engine. A pair of seals are disposed in the spool valve on both axial sides of the valving groove, at locations between the valving groove and the respective hydraulic chambers. Drain passages are formed in the spool piston axially between the two seals at each axial side. The drain passages are formed as annular grooves at the outer periphery of the spool valve. Radial passages extend radially into the spool valve from those annual grooves. The radial passages are connected by a passage extending axially through the spool valve. One of the annular grooves communicates with a drain passage in a valve body which defines the spool valve orifice. That annular groove is of a relatively great axial length such that it still communicates with the drain passage through all movement of the spool valve.

When the spool valve is operated to increase the amount of water flow, oil is sent to one side of the spool valve. The spool valve then moves towards a position allowing water flow between the two passages. Should any oil leak towards the valving groove, it will enter the drain passages and be removed from the valve body. Alternatively, if any water leaks from the center valving groove axially outwardly towards the hydraulic chambers, that water will be removed through the drain passages. In this way, it is ensured that the water delivered to the turbine engine contains no hydraulic fluids such as oil, which could cause increased emissions. Further, it is ensured that no water will leak into the oil in the hydraulic chambers, which could degrade the oil.

These and other objects and features of the present invention can be best understood from the following specification and drawings of which the following is a brief description.

BRIEF DESCRIPTION OF THE DRAWINGS

FIG. 2 is a cross-sectional view of the valves incorporated into the schematic circuit illustrated in FIG. 1.

FIG. 3 is an enlarged view of a portion of the valve illustrated in FIG. 2.

DETAILED DESCRIPTION OF A PREFERRED EMBODIMENT

Figure 1:
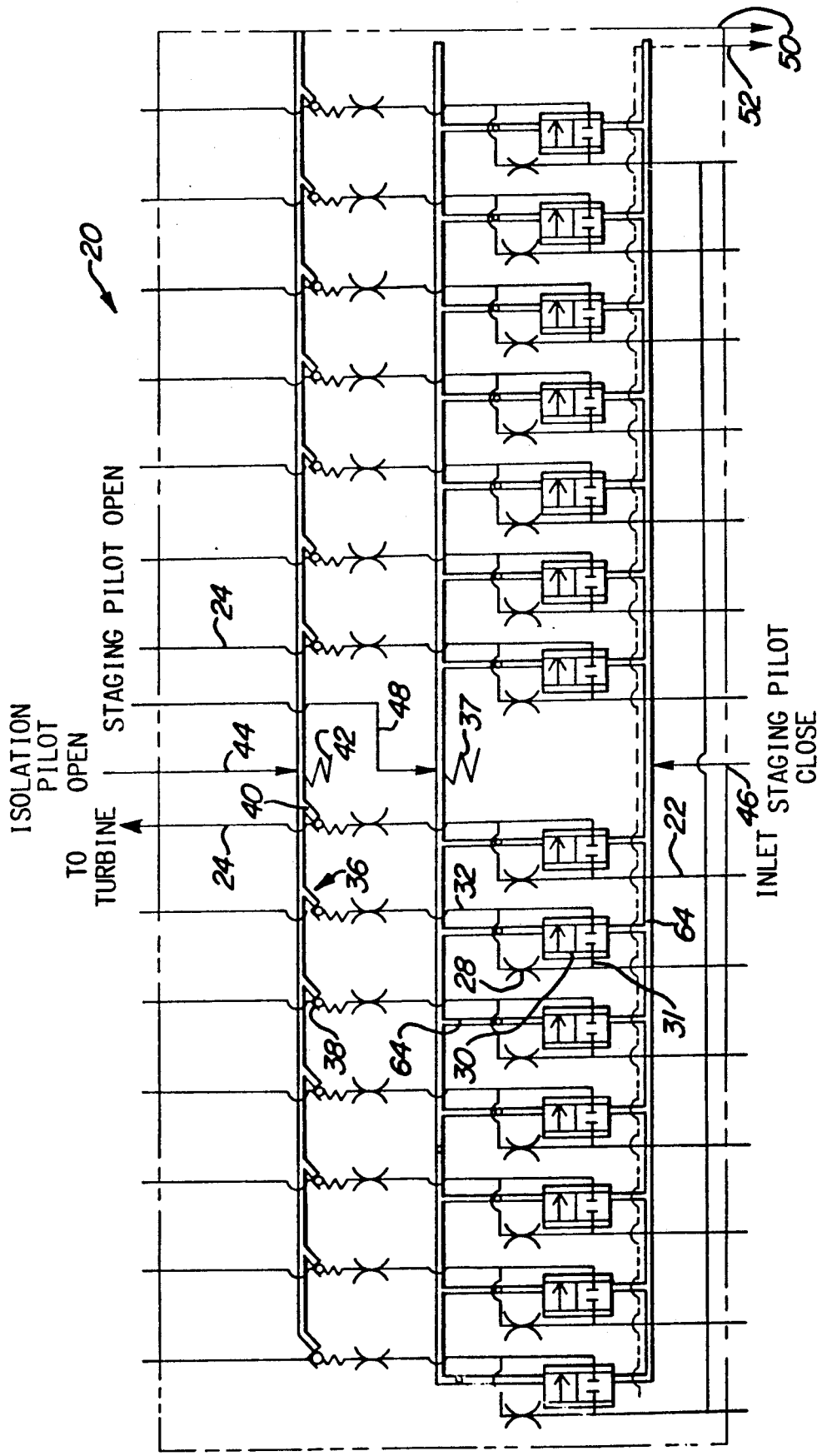
FIG. 1 is a largely schematic view of a valve for dividing a flow of water into fourteen lines and then delivering the water to a turbine engine.

FIG. 1 shows a schematic circuit 20 for dividing a water supply into fourteen separate lines, and delivering that flow to a turbine engine. A single source of water feeds a plurality of water inlets 22, fourteen of which are illustrated, lead through circuit 20 to outlets 24. Outlets 24 communicates with a turbine engine.

Each inlet 22 normally communicates to line 32 through a restriction 28. A staging valve 30 is normally closed, blocking flow from line 31 to line 32. By selectively directing pressurized hydraulic fluid to line 46 or 48, valve 30 is opened or closed to allow or block water flow from line 31 to line 32. Spring 37 normally biases valve 30 to the closed position. The fluid reaching line 32, either through restriction 28, or valve 30, is directed through an isolation valving system 36 that includes cartridge valve 38, which is opened by an isolation valve 40. Isolation valve 40 is normally biased by spring 42 to a position at which it does not open cartridge valve 38. Fluid passing into line 32, and through an open cartridge valve 38, reaches outlet 24.

A pilot hydraulic fluid supply 44 directs hydraulic fluid to move isolation valve 40 against spring 42 and open cartridge valves 38. This is done when it is desired to deliver water to the turbine engine, typically upon start-up of the engine. Hydraulic supply 46 may still deliver fluid maintaining staging valve 30 closed. Sometime after start-up hydraulic supply 48 may deliver fluid, such that the bias of spring 37 can be overcome and staging valve 30 opened. Staging valve 30 is typically opened after start-up to increase the flow of water to the engine.

Circuit 20 as described to this point is similar to the prior art valve described above. Staging valve 30 for each of the 14 water lines is actually a single spool valve. This type of valve provides improved flow control, but there is a good chance of leakage and mixing between the hydraulic fluid for moving valve 30 and the water being directed to the engine. The present invention has achieved a unique sealing and drainage combination which prevents the water and hydraulic fluid from intermixing.

First drain system 50 drains hydraulic fluid which may leak from hydraulic line 44. Second drain system 52, shown somewhat schematically, drains any leakage water or oil which might otherwise intermix at staging valve 30. The structure of drain system 52 and an associated sealing system forms the inventive feature of this application.

FIG. 2 illustrates combined valves 30 and 36. Staging section 55 includes fluid supply 57 extending axially into a valve body 58. That single inlet 57 is divided into a plurality of radial lines 59, which extend to respective axial passages 60. Axial passages 60 extend to radially inwardly extending passages 62, which extend into valve orifice 63. Valve orifice 63 receives spool valve 64. Spool valve 64 includes a valving land 66 and an associated valving groove 68 axially adjacent land 66. A second downstream radial line 70 extends from orifice 63 and communicates with a further axial flow line 72. The combination of lines 70 and 72 form line 32 as shown in FIG. 1. Radial line 62 normally communicates to line 72 through restriction 28.

An isolation valve 40 is selectively forced against the bias of spring 42 to push pin 76 and open cartridge valve 38. This allows fluid to flow from line 72 into line 78, which in turn communicates with an outlet 24.

There is a single spool valve 64 and isolation valve 40, but a plurality of lines 59, 60, 62, 70, 72 and restrictions 28 and cartridge valves 38. Groove 68 is continuous about the outer periphery of spool valve 64.

Drain system 52 includes drain outlet 80 leading outwardly of body 58. Outlet 80 communicates with radial passage 82 leading inwardly to communicate with an annular drain groove 84 formed in the outer periphery of spool valve 64. Annular groove 84 communicates with a pair of radial passages 86 which each extend radially inwardly to one of a pair of axial passages 88. Axial passages 88 each extend to one of a pair of second radial passages 89 which communicates with another annual drain groove 90 at the outer periphery of spool valve 64. A first seal assembly 91 is spaced between valving groove 68 and annular groove 90. The details of seal assembly 91 will be described with reference to FIG. 3. A second seal assembly 92 is spaced between annular groove 90 and the end of spool valve 64 adjacent hydraulic chamber 94. A sliding ring 95 assists sliding movement of spool valve 64.

At the opposed axial end of spool valve 64, third seal assembly 96 is spaced between annular groove 84 and valving groove 68. Similarly, a fourth seal assembly 98 is spaced between chamber 99 and annular groove 84. A sliding ring 100 is disposed adjacent the end of spool piston 64.

Hydraulic line 46 leads into chamber 99 at one axial end of piston 64, while chamber 94 disposed at the opposed end of orifice 63 receives fluid from line 38. A restriction 106 is disposed on line 38 to limit flow outwardly of chamber 94 and slow the opening of spool valve 64. This allows spool valve 64 to slowly increase the flow of water to the engine.

Since spool valve 64 moves axially, the axial length of annular groove 84 is formed greater than the axial length of drain passage 82. This ensures that annular groove 84 will communicate with passage 82 throughout axial movement of spool valve 64. Annular groove 84 is also axially larger than annular groove 90.

As shown in FIG. 3, seal assembly 91 has a generally cylindrical outer sealing ring 110, and an O-ring 112 received radially inwardly from the cylindrical sealing ring 110. O-ring 112 biases sealing ring 110, into contact with the inner periphery of the valve orifice 63. O-ring 112 and cylindrical seal 110 are received in groove 114 in spool valve 64. The other seal assemblies 92, 96 and 98 are constructed similarly.

When it is desired to supply water to a turbine engine, isolation valve 40 is moved against spring 42 to open the plurality of cartridge valves 38. Water is delivered from inlet 57, into radial passage 59, axial passage 60, into line 72 through restriction 28 and outwardly of lines 78 to the turbine engine. When it is desired to increase the flow, hydraulic fluid is supplied to chamber 99 through line 46. This fluid overcomes the force from spring 37, and valving groove 68 slowly begins to open communication between lines 62 and 70, gradually increasing the amount of water flowing to line 72.

Any hydraulic fluid which may leak from chamber 94 past seal 92, reaches annular groove 90. It is then directed through passage 89 to passage 88, passage 86, into annular orifice 84, into passage 82 and outwardly of drain outlet 80. Thus, leakage oil will not reach groove 68. Similarly, should any oil leak past seal 98, it will be removed into annular groove 84, outwardly of drain passage 82 and drain outlet 80. Thus, the oil will not reach groove 68. This assures that the oil will not be mixed with the water delivered to the turbine engine.

Alternatively, should any water in groove 68 leak past seals 91 or 96, it will also enter into one of the annular grooves 90 or 84 and be directed outwardly through drain outlet 80.

When it is desired to close spool valve 64, the flow of hydraulic fluid through line 46 is stopped and spring 37 begins to move spool valve 64 back to the left as shown in FIG. 2. Hydraulic fluid also moves through line 38 back into chamber 94.

Most preferably, the O-rings are flourocarbon viton O-rings available from Federal Mogul Corporation of Southfield, Mich. under their catalog number V14-75. The cylindrical seal rings are preferably of the type available under the trade name Glyd Ring TM, series 28-42, from W. S. Shanban and Company of West Los Angeles, Calif. The sliding rings are preferably of the type available under the trade name Slydring TM, type T, and also available from W. S. Shanban and Company.

Although a preferred embodiment of the present invention has been disclosed, it should be understood that a worker of ordinary skill in the art would recognize certain modifications would come within the scope of this invention. For that reason, the following claims should be studied in order to determine the true scope and content of this invention.

I claim:

1. A valve system for directing flow of water from a source of water to a turbine engine comprising:
    a valve body having a first passage adapted to be connected to a source of water, said first passage communicating with a valve orifice in said valve body, a second passage in said valve body leading from said valve orifice and adapted to be connected to a turbine engine;
    a spool valve disposed within said valve orifice, extending between first and second axial ends, and having a central land at an outer periphery which blocks communication between said first and second passage, and a valving groove at said outer periphery which allows communication between said first and second passages;
    a first hydraulic cylinder defined by said valve orifice and said first end of said spool valve, and a second hydraulic cylinder defined by said valve orifice and said second axial end of said spool valve, hydraulic fluid being selectively communicated to said hydraulic cylinders to contact said first and second axial ends and control movement of said spool valve to either block or allow communication between said first and second passages;
    first and second seals disposed between said first end of said spool valve and said valving groove, said first and second seals being spaced axially, third and fourth seals being disposed between said second axial end of said spool valve and said valving groove, said third and fourth seals being spaced axially;
    a first drain groove formed at an axial position between said first and second seals and a second drain groove formed at an axial position between said third and fourth seals, whereby any water which passes one of said seals reaches one of drain grooves and is drained outwardly of said valve body before reaching either of said hydraulic chambers, and any hydraulic fluid which passes one of said seals and reaches one of said drain grooves is drained outwardly of said valve body before reaching said valving groove.

2. A system as recited in claim 1, wherein said drain grooves are formed as annular grooves in the outer periphery of said spool valve.

3. A system as recited in claim 2, wherein each of said annular grooves is associated with at least one radial passage leading radially into said spool valve, and an axial passage within said spool valve connects said radial passages associated with said two annular grooves.

4. A system as recited in claim 3, wherein a drain passage is formed in said valve body and communicates with at least one of said annular grooves to drain any leakage fluid outwardly of said valve body.

5. A system as recited in claim 4, wherein each of said first through fourth seals comprises a generally cylindrical sealing ring at the outer periphery of said spool valve and an O-ring radially inwardly from said cylindrical sealing ring, said sealing ring and said O-ring being disposed in a groove at said outer periphery of said spool valve.

6. A system as recited in claim 1, wherein said spool valve includes a plurality of said first passages and a plurality of said second passages.

7. A system as recited in claim 1, wherein said second passage leads to a second valve which is selectively opened to allow flow to the turbine engine.

8. A system as recited in claim 7, wherein said drain grooves are formed as annular grooves in the outer periphery of said spool valve.

9. A system as recited in claim 8, wherein each of said annular grooves is associated with at least one radial passage leading radially into said spool valve, and an axial passage within said spool valves connects said radial passages associated with said two annular grooves.

10. A system as recited in claim 9, wherein a drain passage is formed in said valve body and communicates with at least one of said annular grooves to drain any leakage fluid outwardly of said valve body.

11. A system as recited in claim 10, wherein each of said first through fourth seals comprises a generally cylindrical sealing ring at the outer periphery of said spool valve and an O-ring radially inwardly from said cylindrical sealing ring, said sealing ring and said O-ring being disposed in a groove at said outer periphery of said spool valve.

12. A system as recited in claim 11, wherein said one annular groove which communicates with said drain passage in said valve body extends for a greater axial length than said drain passage such that it is ensured that said annular groove continues to fully communicate with said drain passage during movement of said spool valve.

13. A system as recited in claim 12, wherein said one annular groove extends for a greater axial length than the other of said annular grooves.

14. A turbine engine valving system for directing flow of water from a source of water to the turbine engine comprising:
    a valve body having a first passage adapted to be connected to a source of water, said first passage communicating with a valve orifice in said valve body, a second passage in said valve body leading from said valve orifice to a turbine engine;
    a spool valve disposed within said valve orifice, extending between first and second axial ends, and having a central land at an outer periphery which may block communication between said first and second passage, and a valving groove at said outer periphery which allows communication between said first and second passages;
    a first hydraulic cylinder defined by said valve orifice and aid first axial end of said spool valve, and a second hydraulic cylinder defined by said valve orifice and said second axial end of said spool valve, hydraulic fluid being selectively communicated to said hydraulic cylinders to control movement of said spool valve to either block or allow communication between said first and second passages;

first and second seals disposed between said first end of said spool valve and said valving groove, said first and second seals being spaced axially, third and fourth seals being disposed between said second axial end of said spool valve and said valving groove, said third and fourth seals being spaced axially;

a first annular drain groove formed at an axial position between said first and second seals and a second annular drain groove formed at an axial position between said third and fourth seals, a radial passage leading radially into said spool valve from each of said annular grooves, and an axial passage within said spool valve connecting said radial passages; and a drain passage formed in said valve body, and axially aligned with one of said annular grooves in said spool valve to communicate any leakage fluid from said annular groove outwardly of said valve body, whereby any water from said first or second passage or said valving groove which passes one of said seals reaches one of drain grooves and is drained outwardly of said valve body before reaching either of said hydraulic chambers, and any hydraulic fluid which passes one of said seals and reaches one of said drain grooves is drained outwardly of said valve body before reaching said valving groove.

15. A system as recited in claim 14, wherein said one annular groove which communicates with said drain passage in said valve body extends for a greater axial length than said drain passage such that it is ensured that said annular groove continues to fully communicate with said drain passage during movement of said spool valve.

16. A system as recited in claim 15, wherein said one annular groove extends for a greater axial length than the other of said annular grooves.

17. A system as recited in claim 14, wherein each of said first through fourth seals comprises a generally cylindrical sealing ring at the outer periphery of said spool valve and an O-ring radially inwardly from said cylindrical sealing ring, said sealing ring and said O-ring being disposed in a groove at said outer periphery of said spool valve.

* * * * *